US 8,627,492 B2

(12) United States Patent
Ishiguro et al.

(10) Patent No.: US 8,627,492 B2
(45) Date of Patent: Jan. 7, 2014

(54) IMAGE PROCESSING APPARATUS, IMAGE PROCESSING METHOD, AND RECORDING MEDIUM

(75) Inventors: Kazuhiro Ishiguro, Toyohashi (JP); Takayuki Nabeshima, Toyokawa (JP); Hideyuki Toriyama, Toyokawa (JP); Hiroyuki Suzuki, Toyokawa (JP); Masaaki Saka, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1558 days.

(21) Appl. No.: 11/876,647

(22) Filed: Oct. 22, 2007

(65) Prior Publication Data

US 2008/0184364 A1     Jul. 31, 2008

(30) Foreign Application Priority Data

Oct. 27, 2006   (JP) .................................. 2006-293227

(51) Int. Cl.
*H04L 9/32*     (2006.01)
*G06F 7/04*     (2006.01)

(52) U.S. Cl.
USPC .................. 726/27; 726/16; 726/19; 726/26; 726/31; 358/1.14

(58) Field of Classification Search
USPC ......................................................... 726/27
See application file for complete search history.

(56) References Cited

U.S. PATENT DOCUMENTS 5,465,353 A  *  11/1995  Hull et al. .............................. 1/1
5,671,277 A     9/1997  Ikenoue et al.
(Continued)

FOREIGN PATENT DOCUMENTS

JP    07-114299 A     5/1995
JP    2001-078015    3/2001
(Continued)

OTHER PUBLICATIONS

Samsung Electronics, "Samsung Multifunction Printer's Practical Use Guide", 2011 Samsung Electronics Co., Ltd., entire document, http://www.samsung.com/us/pdf/PNT_Samsung_MFPs_PracticalUseGuide_v2.pdf.*

(Continued)

*Primary Examiner* — Edan Orgad
*Assistant Examiner* — Ronald Baum
(74) *Attorney, Agent, or Firm* — Buchanan Ingersoll & Rooney PC

(57) ABSTRACT

An image processing apparatus comprising: an input portion that inputs image data of a plurality of pages of document; a password detector that detects a password given to each of the pages; a password judger that judges from the detecting results drew by the password detector whether or not different passwords are detected from each of the pages; a correlation judger that judges about each of the pages if the password judger judges that different passwords are detected from each of the pages, whether or not the passwords are correlated to each other; and an output permitting portion that permits the image data of all the pages, which are the image data inputted by the input portion, to be outputted without requesting entry of all passwords, if it is judged about each of the pages that the passwords are correlated to each other, on the other hand, requests entry of a password about each of the pages if it is judged about at least one of the pages that the passwords are not correlated to each other, then permits the image data of a certain page to be outputted, if an appropriate password is entered about that page.

15 Claims, 8 Drawing Sheets

(56) References Cited

U.S. PATENT DOCUMENTS

| | | | |
|---|---|---|---|
| 6,047,377 A * | 4/2000 | Gong | 726/21 |
| 6,236,996 B1 * | 5/2001 | Bapat et al. | 1/1 |
| 6,389,589 B1 * | 5/2002 | Mishra et al. | 717/170 |
| 6,463,541 B2 * | 10/2002 | Hu | 726/27 |
| 7,266,215 B2 * | 9/2007 | Ikenoue et al. | 382/100 |
| 7,369,279 B2 * | 5/2008 | Van Oosterhout | 358/3.28 |
| 7,555,769 B1 * | 6/2009 | Shapiro et al. | 726/1 |
| 7,574,407 B2 * | 8/2009 | Carro et al. | 705/59 |
| 7,784,087 B2 * | 8/2010 | Yami et al. | 726/4 |
| 7,818,215 B2 * | 10/2010 | King et al. | 705/26.1 |
| 2002/0174010 A1 * | 11/2002 | Rice, III | 705/14 |
| 2004/0042830 A1 | 3/2004 | Kaburagi et al. | |
| 2004/0184065 A1 | 9/2004 | Guan et al. | |
| 2005/0022032 A1 * | 1/2005 | Zhao | 713/201 |
| 2005/0151992 A1 * | 7/2005 | Shaw et al. | 358/1.14 |
| 2006/0028530 A1 | 2/2006 | Nishiyama | |
| 2006/0064741 A1 * | 3/2006 | Terao | 726/4 |
| 2006/0104515 A1 * | 5/2006 | King et al. | 382/190 |
| 2006/0143706 A1 * | 6/2006 | Kawasaki et al. | 726/19 |
| 2007/0204164 A1 * | 8/2007 | Cattrone et al. | 713/176 |

FOREIGN PATENT DOCUMENTS

| | | |
|---|---|---|
| JP | 2004-013378 | 1/2004 |
| JP | 2005-148393 A | 6/2005 |
| JP | 2005-151149 A | 6/2005 |

OTHER PUBLICATIONS

Notification of Reasons for Refusal in JP 2006-293227 dated Mar. 25, 2008, and English Translation thereof.

* cited by examiner

IMAGE PROCESSING APPARATUS, IMAGE PROCESSING METHOD, AND RECORDING MEDIUM

This application claims priority under 35 U.S.C. §119 to Japanese Patent Application No. 2006-293227 filed on Oct. 27, 2006, the entire disclosure of which is incorporated herein by reference in its entirety.

BACKGROUND OF THE INVENTION

1. Field of the Invention

The present invention relates to an image processing apparatus that is applied to MFPs (Multi Function Peripherals) capable of administrating an output operation performed on confidential documents, etc., an image processing method, and a recording medium having an image processing program stored therein to make a computer of the image processing apparatus execute image processing.

2. Description of the Related Art

The following description sets forth the inventor's knowledge of related art and problems therein and should not be construed as an admission of knowledge in the prior art.

For example, as disclosed in Japanese Unexamined Laid-open Patent Publications No. 6-20027, No. 2005-151149 and No. 2005-148393, when a document that should be protected by security is outputted, additional information is embedded in a ground pattern or other behind an image on the document, then an operation to copy the document is performed under control according to the embedded information, so that any third party could not copy the document without permission.

However, with this configuration to perform an operation to copy a document under control according to additional information embedded in the document as described above, even a right user such as an owner of the document may be prohibited from performing that operation, which still leaves very much inconveniences.

To cope with this issue, Japanese Unexamined Laid-open Patent Publication No. 2005-201069 discloses an art, wherein if a ground pattern given behind an image on a document is detected as the one indicating "output prohibit", a password is simply entered to cancel output prohibit.

However, with this art disclosed in Japanese Unexamined Laid-open Patent Publication No. 2005-201069, when a right user such as an owner of a document intends to output the document, he/she needs to enter a password in order to cancel copy prohibit every time he/she encounters it, which would cause troubles and poor user operability.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that ensures document security and improves user operability desired when a user such as a right user intends to output a document.

It is another object of the present invention to provide an image processing method that ensures document security and improves user operability desired when a user such as a right user intends to output a document.

It is yet another object of the present invention to provide a recording medium having an image processing program stored therein to make a computer of the image processing apparatus execute image processing by the image processing method.

According to a first aspect of the present invention, an image processing apparatus comprises:
- an input portion that inputs image data of a plurality of pages of document;
- a password detector that detects a password given to each of the pages;
- a password judger that judges from the detecting results drew by the password detector whether or not different passwords are detected from each of the pages;
- a correlation judger that judges about each of the pages if the password judger judges that different passwords are detected from each of the pages, whether or not the passwords are correlated to each other; and
- an output permitting portion that permits the image data of all the pages, which are the image data inputted by the input portion, to be outputted without requesting entry of all passwords, if it is judged about each of the pages that the passwords are correlated to each other, on the other hand, requests entry of a password about each of the pages if it is judged about at least one of the pages that the passwords are not correlated to each other, then permits the image data of a certain page to be outputted, if an appropriate password is entered about that page.

According to a second aspect of the present invention, an image processing apparatus comprises:
- a first password detector that detects a first password from a medium having the first password given thereto;
- a document transfer device;
- an image reader that reads an image on a document transferred by the transfer device;
- a second password detector that detects a second password from the document;
- a judger that judged whether or not the first password detected by the first password detector and the second password detected by the second password detector, are correlated to each other; and
- an output permitting portion that permits image data read out from the document by the image reader to be outputted if it is judged that the first password and the second password are correlated to each other, on the other hand, requests entry of a password correlated to the second password, if it is judged that the first password and the second password are not correlated to each other, then permits the image data read out from the document to be outputted if a password correlated to the second password is entered.

According to an third aspect of the present invention, an image processing method comprises:
- inputting image data of a plurality of pages of document;
- detecting a password given to each of the pages;
- judging from the detecting results whether or not different passwords are detected from each of the pages;
- judging about each of the pages if different passwords are detected from each of the pages, whether or not the passwords are correlated to each other; and
- permitting the inputted image data of all the pages to be outputted without requesting entry of all passwords, if it is judged about each of the pages that the passwords are correlated to each other, on the other hand, requesting entry of a password about each of the pages if it is judged about at least one of the pages that the passwords are not correlated to each other, then permitting the image data of a certain page if an appropriate password is entered about that page.

According to a forth aspect of the present invention, an image processing method comprises:

detecting a first password from a medium having the first password given thereto;

reading by an image reader, an image on a document transferred by a document transfer device;

detecting a second password from the document;

judging whether or not the detected first password and second password are correlated to each other; and permitting image data read out from the document by the image reader, to be outputted if it is judged that the first password and the second password are correlated to each other, on the other hand, requesting entry of a password correlated to the second password, if it is judged that the first password and the second password are not correlated to each other, then permitting the image data read out from the document, to be outputted if a password correlated to the second password is entered.

According to a fifth aspect of the present invention, a recording medium having an image processing program stored therein to make a computer of an image processing apparatus execute:

inputting image data of a plurality of pages of document;

detecting a password given to each of the pages;

judging from the password detecting result whether or not different passwords are detected from each of the pages;

judging about each of the pages if different passwords are detected from each of the pages, whether or not the passwords are correlated to each other; and permitting the inputted image data of all the pages to be outputted without requesting entry of all passwords, if it is judged about each of the pages that the passwords are correlated to each other, on the other hand, requesting entry of a password about each of the pages if it is judged about at least one of the pages that the passwords are not correlated to each other, then permitting the image data of a certain page to be outputted if an appropriate password is entered about that page.

According to a sixth aspect of the present invention, a recording medium having an image processing program stored therein to make a computer of an image processing apparatus execute:

detecting a first password from a medium having the first password given thereto;

reading by an image reader an image on a document transferred by a document transfer device;

detecting a second password from the document;

judging whether or not the detected first password and second password are correlated to each other; and permitting image data read out from the document by the image reader to be outputted if it is judged that the first password and the second password are correlated to each other, on the other hand, requesting entry of a password correlated to the second password if it is judged that the first password and the second password are not correlated to each other, then permitting the image data read out from the document to be outputted if a password correlated to the second password is entered.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
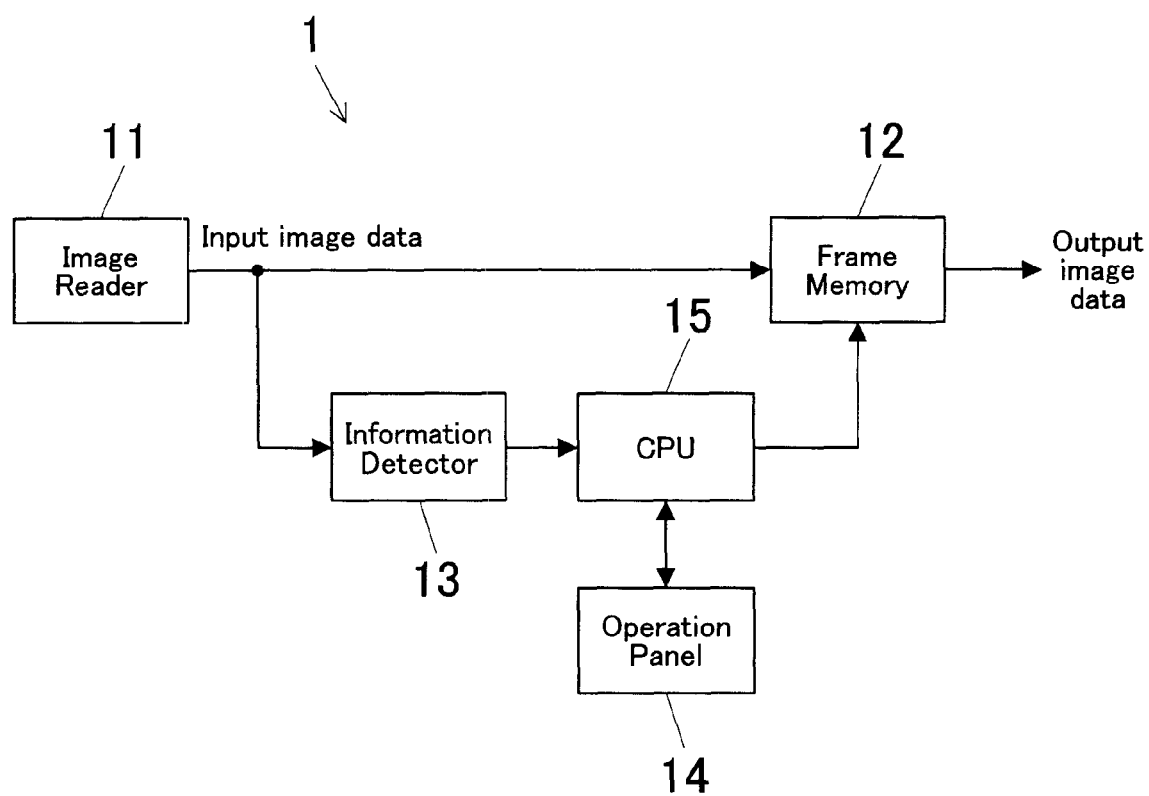
FIG. 1 is a block diagram showing a configuration of an image processing apparatus according to one embodiment of the present invention.
Figure 3:
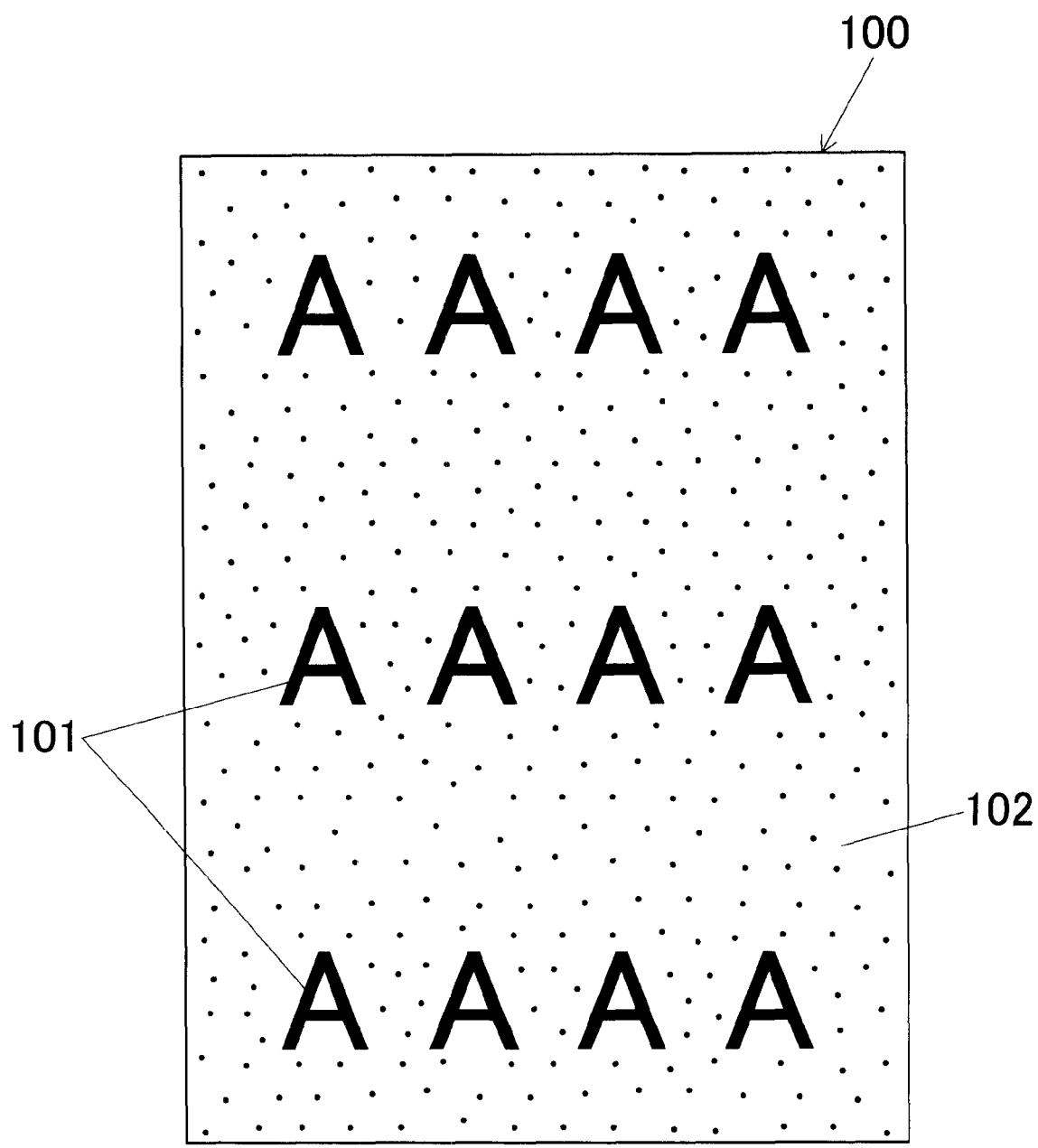
FIG. 3 is a view showing an example of a document to be read in the image processing apparatus shown in FIG. 1 and FIG. 2.

As shown in a block diagram of FIG. 1, an image processing apparatus 1 reads a document 100 shown in FIG. 3, which has a ground pattern 102 given behind an image 101 thereon, and detects a password from information embedded in the ground pattern 102. The image processing apparatus 1 is an image forming apparatus that is a MFP or other.

The image processing apparatus 1 shown in FIG. 1 comprises an image reader 11, a frame memory 12, an information detector 13, an operation panel 14 and a CPU 15.

The image reader 11 reads an image on the document 100 having a ground pattern, and it is a scanner.

The frame memory 12 temporarily accumulates image data read out from a document by the image reader 11, until the CPU 15 gives permission.

The information detector 13 detects information that is embedded in the ground pattern 102 given to the document 100, about each of the pages.

Figure 5:
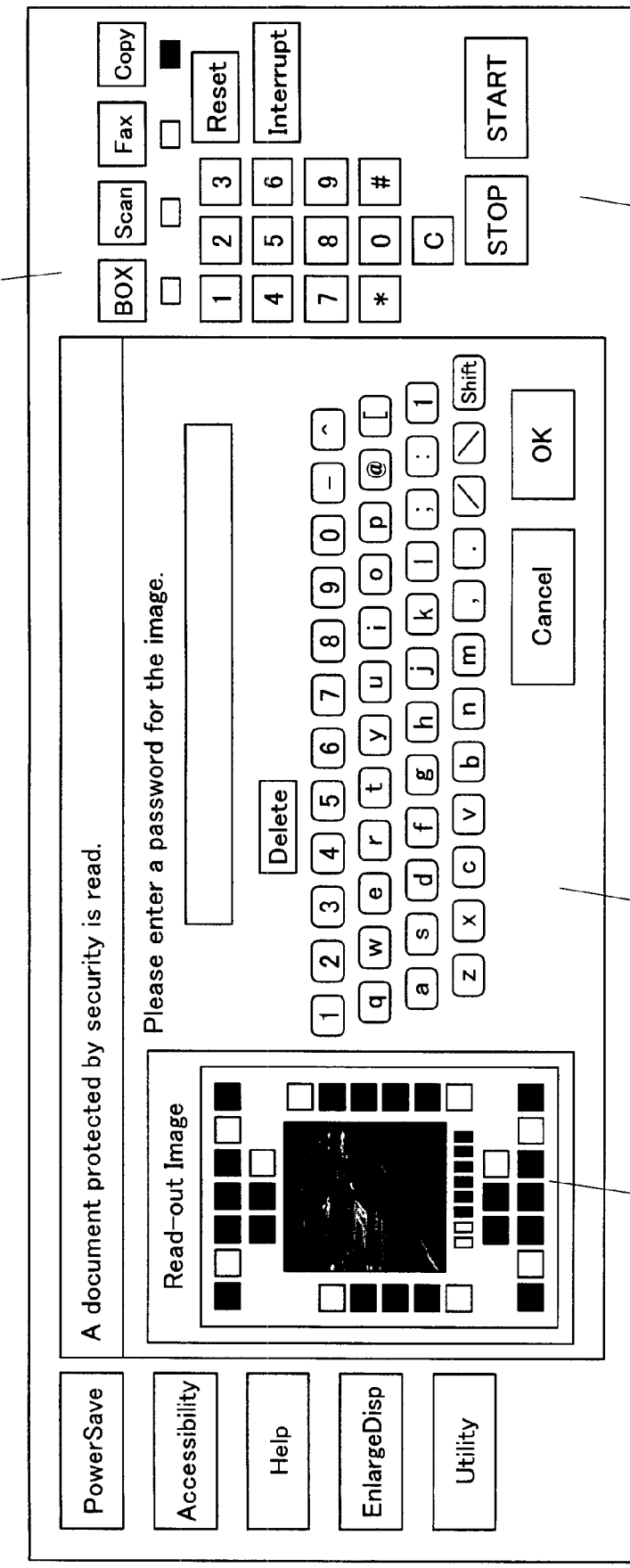
FIG. 5 is a screen requesting entry of a password.

The operation panel 14 is used by users to perform various operations and entry, and comprises a display 14a and a key board 14b as shown in FIG. 5.

The CPU 15 controls the entire image processing apparatus 1 by executing an operation program stored in a recording medium such as a ROM not shown in Figure. For example, a password is detected from the information detected by the information detector 13, under the control of the CPU 15.

Further, under the control of the CPU 15, it is judged whether or not different passwords are detected from each of the pages, and if different passwords are detected, it is judged about each of the pages whether or not these passwords are correlated to each other, and depending on the judging result, image data is permitted to be outputted without a password requested to be entered, or a screen requesting entry of a password is displayed on the display 14*a* of the operation panel 14. If entry of a password is requested, target image data needing the password is also displayed thereon. These operations controlled by the CPU 15 as described above will be detailed later.

Figure 2:
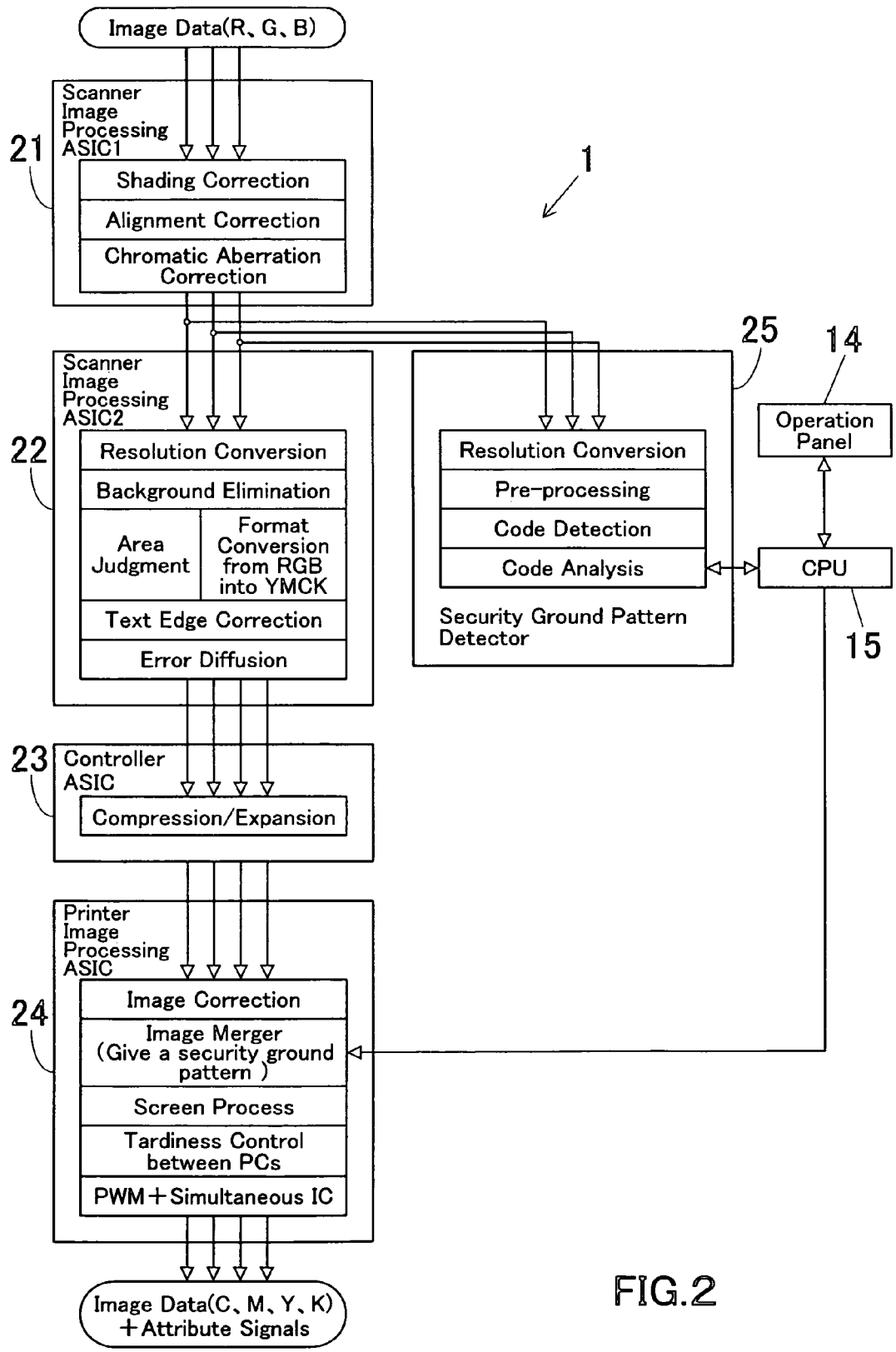
FIG. 2 is a view showing a functional configuration of the image processing apparatus shown in FIG. 1, which focuses on the flow of image data.

As shown in FIG. 2 illustrating a functional configuration of the image processing apparatus 1, which focuses on the flow of image data, RGB image data read out by the image reader 11 is inputted into a first scanner image processor 21. The first scanner image processor 21 performs on the inputted image data, shading correction, alignment correction, chromatic aberration correction, and etc.

The image data processed by the first scanner image processor 21 is inputted into a second scanner image processor 22. The second scanner image processor 22 performs on the image data, resolution conversion, background elimination, area judgment, format conversion from RGB to YMCK, text edge correction, error diffusion, and etc.

The image data processed by the second scanner image processor 22 is inputted into a controller 23. The controller 23 executes compression/expansion of the image data.

The image data compressed/expanded by the controller 23 is inputted into a printer image processor 24. The printer image processor 24 performs on the image data to be printed, image correction, image merger (giving a security ground pattern), a screen process and etc., and then outputs the image data.

On the other hand, the image data processed by the first scanner image processor 21 is also inputted into a security ground pattern detector 25 that is the information detector 13. The security ground pattern detector 25 detects the ground pattern 102 having an embedded password from the image data processed by the first scanner image processor 21. Concretely, respective processes such as resolution conversion, pre-processing, code detection, code analysis, and etc. are performed under the control of the CPU 15, and thereby the ground pattern 102 is detected.

Figure 4:
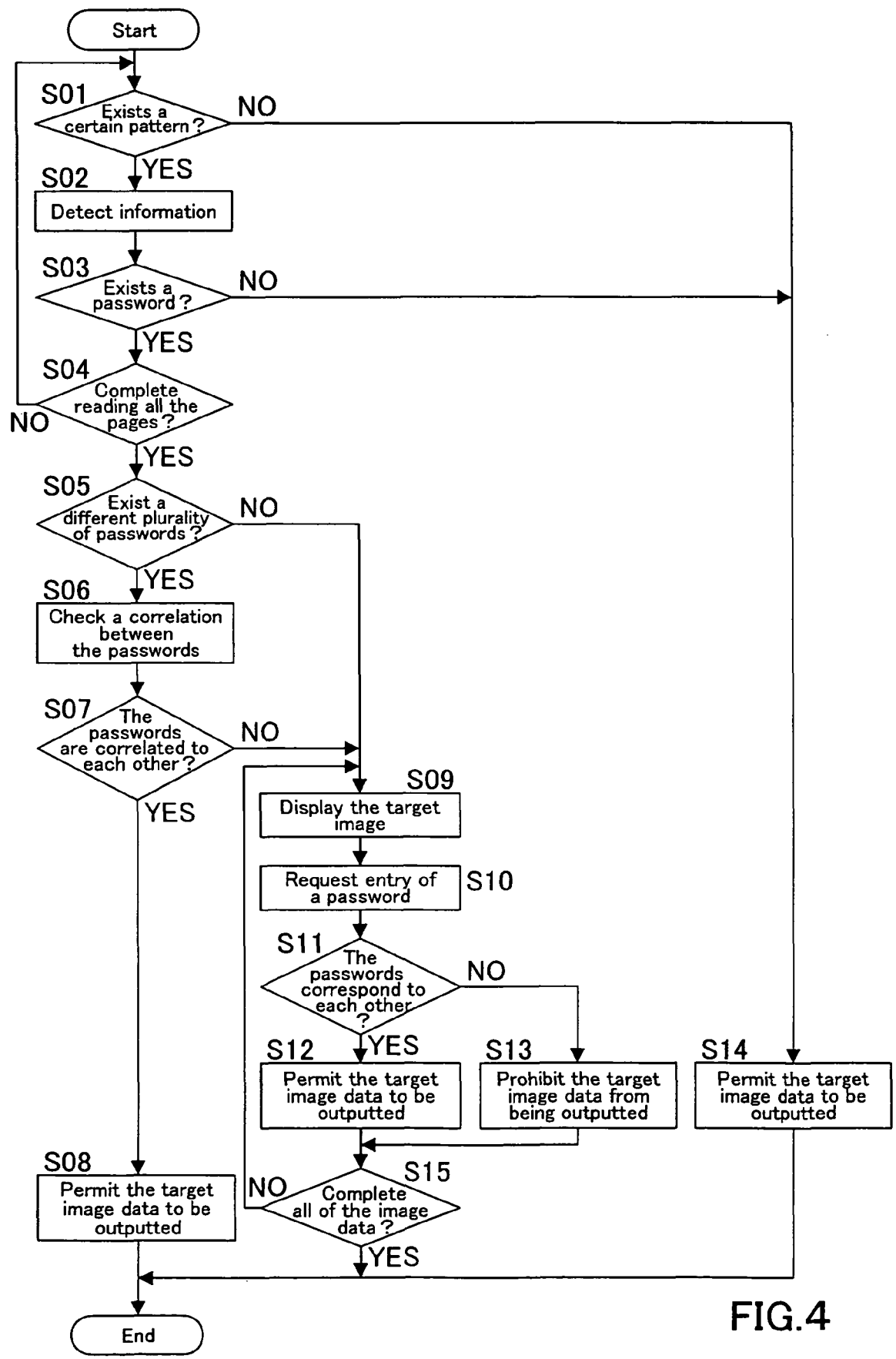
FIG. 4 is a flowchart showing a procedure performed in the image processing apparatus, to judge whether or not to permit image data to be outputted.

Hereinafter, a procedure performed in the image processing apparatus 1 shown in FIG. 1 and FIG. 2, to judge whether or not to permit image data to be outputted, will be explained with reference to a flowchart shown in FIG. 4. The procedure is executed by the CPU 15 according to an operation program stored in a recording medium such as a ROM not shown in Figure.

In Step S01, it is judged whether or not image data read out from a document by the image reader 11 includes a certain ground pattern. If a certain pattern is not detected (NO in Step S01), the image data is immediately permitted to be outputted in Step S14, since the document is a normal one not protected by security.

If a certain pattern is detected (YES in Step S01), information embedded in the certain pattern is detected (Step S02), and it is judged whether or not the detected information includes a password (Step S03).

If there exists no password (NO in Step S03), the routine skips ahead to Step S14, and the image data is permitted to be outputted.

If there exists a password (YES in Step S03), it is judged whether or not all the pages are completely read (Step S04). If all the pages are not yet completely read (NO in Step S04), the routine returns to Step S01 to repeat Steps S01 through S04. If all the pages are completely read (YES in Step S04), the routine proceeds to Step S05, and it is judged about each of the pages whether or not different passwords are detected. If different passwords are detected (YES in Step S05), the routine proceeds to Step S06.

In Step S06, a correlation between the different passwords is checked about each of the pages.

Any of the following examples can be employed as the correlation between the passwords:

The passwords are included in information owned by data of one page of document, and related to each other.
    The passwords share a certain code.
    The passwords are numbers complemented by each other.
    The passwords consist of a sequence of one same number.

Subsequently, it is judged in Step S07 about each of the pages whether or not the passwords are correlated to each other. If these are correlated to each other (YES in Step S07), the image data of all the pages are permitted to be outputted without a password requested to be entered, in Step S08. Then the routine terminates.

If it is judged in Step S05 about each of the pages that different passwords are not detected (NO in Step S05), or if it is judged in Step S07 about each of the pages that the passwords are not correlated (NO in Step S07), then as shown in FIG. 5, image data 20 read out from Page 1 of the document is displayed on the display 14*a* of the operation panel 14 in Step S09 and a message requesting entry of a password is also displayed on the display 14*a* in Step S10. And thereby a password is entered.

Then, it is judged in Step S11 whether or not an appropriate password is entered, in other words, the entered password corresponds to a password given to the Page 1. If it corresponds (YES in Step S11), the image data is permitted to be outputted in Step S12, and then the routine proceeds to Step S15.

If it does not correspond (NO in Step S11), the image data is prohibited from being outputted in Step S13, and then the routine proceeds to Step S15. In this case of copy prohibit, the image data stored in the frame memory 12 can be deleted.

In Step S15, it is judged whether or not there exists any following image data. If there exists any following image data (NO in Step S15), the routine returns to Step S09, and repeats Steps S09 through S15 until there exists no following image data. In this way, entry of a password is requested about each of the pages, then it is judged whether or not to permit image data read out therefrom to be outputted.

If it is judged whether or not the image data of all the pages are completely permitted/prohibited to be/from being outputted (YES in Step S15), the routine terminates.

After completing the routine, the image data permitted to be outputted are printed by a printer or other not shown in Figure.

As described above in this embodiment, if it is judged about each of the pages that passwords are correlated to each other, image data of all the pages are permitted to be outputted. Thus, a user such as a right user outputs image data of all the pages by a simple operation without entering a password about each of the pages, which contributes to user conveniences.

On the other hand, if it is judged about each of the pages that the passwords are not correlated to each other, entry of a password is requested about each of the pages, and if an appropriate password is entered about a certain page in response to the request, image data of that page is permitted to be outputted, which ensures higher security, since entry of a password is requested about each of the pages in this case.

Hereinafter, another embodiment of the present invention will be explained. An image processing apparatus according to this embodiment has the same configuration as those shown in FIG. 1 and FIG. 2.

A configuration is employed for the image processing apparatus 1 shown in FIG. 1 and FIG. 2, wherein image data of all the pages are permitted to be outputted without any password requested to be entered by a user, if it is judged about each of the pages that the passwords are correlated to each other. Meanwhile, another configuration is employed for the image processing apparatus to be described hereinafter in this embodiment, wherein at least one of the passwords given to each of the pages is requested to be entered, and image data of all the pages are permitted to be outputted, if an appropriate password is entered.

Figure 6:
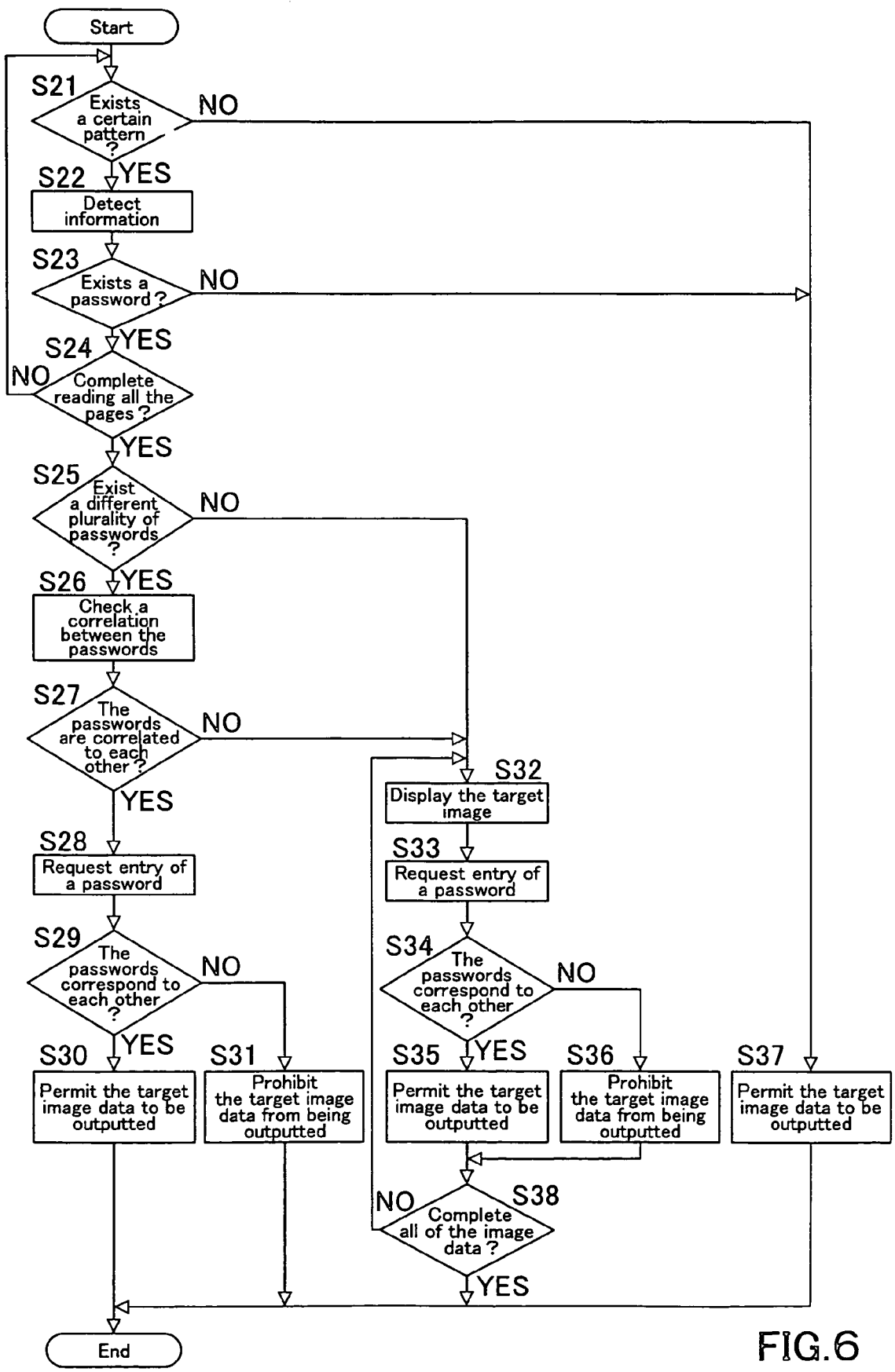
FIG. 6 is a flowchart showing a procedure performed in the image processing apparatus according to another embodiment of the present invention, to judge whether or not to permit image data to be outputted.

A procedure performed in the image processing apparatus according to this embodiment, to judge whether or not to permit image data to be outputted, will be explained with reference to a flowchart shown in FIG. 6. The procedure is executed by the CPU 15 according to an operation program stored in a recording medium such as a ROM not shown in Figure.

In Step S21, it is judged whether or not image data read out from a page of document by the image reader 11 includes a certain ground pattern. If a certain pattern is not detected (NO in Step S21), the image data is immediately permitted to be outputted in Step S37, since the document is a normal one not protected by security.

If a certain pattern is detected (YES in Step S21), information embedded in the certain pattern is detected (Step S22), and then it is judged whether or not the detected information includes a password (Step S23).

If there exists no password (NO in Step S23), the routine skips ahead to Step S37, and the image data is permitted to be outputted.

If there exists a password (YES in Step S23), it is judged whether or not all the pages are completely read (Step S24). If all the pages are not yet completely read (NO in Step S24), the routine returns to Step S21 and repeats Steps S21 through S24. If all the pages are completely read (YES in Step S24), the routine proceeds to Step S25, and it is judged about each of the pages whether or not different passwords are detected from the data. If different passwords are detected (YES in Step S25), the routine proceeds to Step S26.

In Step S26, a correlation between the different passwords is checked about each of the pages.

Then, it is judged in Step S27 about each of the pages whether or not the passwords are correlated to each other. If these are correlated to each other (YES in Step S27), a message requesting entry of a password is displayed on the display 14a of the operation panel 14, in Step S28, and thereby a password is entered.

Subsequently, it is judged in Step S29 whether or not the entered password corresponds to any of the passwords given to the respective pages. If the entered password corresponds to any of those (YES in Step S29), the image data of all the pages are permitted to be outputted in Step S30, then the routine terminates. If the entered password does not correspond to any of those given to the respective pages (NO in Step S29), the image data of all the pages are prohibited from being outputted. In this case of copy prohibit, the image data stored in the frame memory 12 can be deleted.

If it is judged in Step S25 about each of the pages that different passwords are not detected from the data (NO in Step S25), or if it is judged about each of the pages that the passwords are not correlated to each other in Step S27 (NO in Step S27), then image data 20 of Page 1 of the document is displayed on the display 14a of the operation panel 14 in Step S32, and a message requesting entry of a password is also displayed on the display 14a, and thereby a password is entered.

Then, it is judged in Step S34 whether or not an appropriate password is entered, in other words, the entered password corresponds to a password given to the Page 1. If it corresponds (YES in Step S34), the image data is permitted to be outputted in Step S35, and then the routine proceeds to Step S38.

If it does not correspond (NO in Step S34), the image data is prohibited from being outputted in Step S36, and then the routine proceeds to Step S38.

In Step S38, it is judged whether or not there exist any following image data. If there exists any following image data (NO in Step S38), the routine returns to Step S32, and repeats Steps S32 through S38 until there exists no following image data.

If it is judged whether or not the image data of all the pages are completely permitted/prohibited to be/from being outputted (YES in Step S38), the routine terminates.

After completing the routine, the image data permitted to be outputted are printed by a printer or other not shown in Figure.

As described above in this embodiment, even if it is judged about each of the pages that passwords are correlated to each other, entry of a password is requested, and if any of the appropriate passwords is entered, image data of all the pages are permitted to be outputted, which ensures higher document security.

Hereinafter, yet another embodiment of the present invention will be explained.

An image processing apparatus according to this embodiment of the present invention has the same configuration as those of the image processing apparatus shown in FIG. 1 and FIG. 2. In this embodiment, the image reader 11 reads an image on a document placed on a document table as well as an image on a document transferred by a document transfer device.

Figure 7:
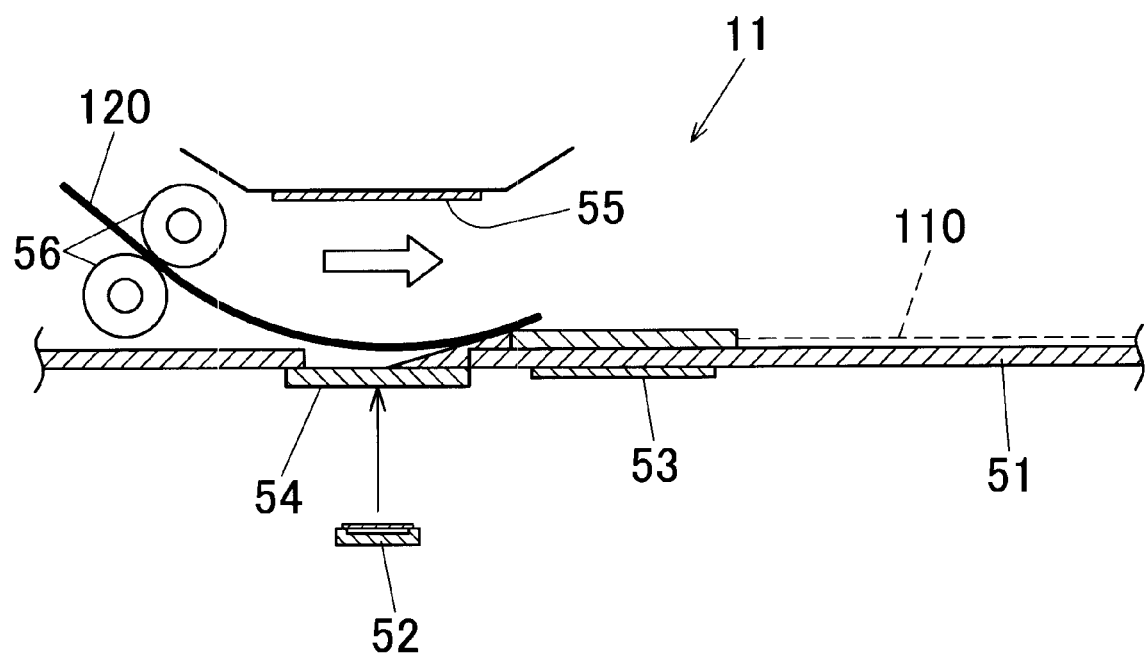
FIG. 7 is a cross-sectional view schematically showing a configuration of an image reader in the image processing apparatus according to yet another embodiment of the present invention.

To achieve this configuration above, as shown in FIG. 7, the image reader 11 comprises a document table 51 on which a document is placed, a shading board 53 provided under the document table 51, a white board 55, document transfer rollers 56 that are collectively a document transfer device, a document table 54 for reading a sliding document, which is provided in the lower location of the white board 55, where a document transferred by the document transfer rollers 56 at a constant speed is read, and a reader 52 provided in the lower location of the document table 54 for reading a sliding document.

When a first document 110 is placed (by a user) on the document table 51 for loading a document, the reader 52 reads an image on the first document 110 on the document table 51, moving at a constant speed to the right direction of FIG. 7 in the lower location of the document table 51. Meanwhile, when the reader 52 reads (skims) an image on a second document 120 while being transferred by the document transfer rollers 56 (a sliding document), the reader 52 keeps still right below the document table 54 for reading a sliding document, in order to do so. The shading board 53 adjusts the white level for the reader 52.

Just like the document 100 shown in FIG. 3, the first document 110 to be placed on the document table 51 has a certain ground pattern 102 embedded therein, and a first password is embedded in the ground pattern 102. The first document can be a card or other having a ground pattern in which a first password is embedded.

Meanwhile, the second document 120 has a certain ground pattern 102 embedded therein, and a second password is embedded in the ground pattern 102.

With the image processing apparatus according to this embodiment, the first document 110 is placed on the document table 51, then image data is read out from the first document by the reader 52, and then the first password is detected from the read-out data, just like with the image processing apparatus shown in FIG. 1 and FIG. 2.

Subsequently, image data is read out from the second document 120 transferred by the document transfer rollers 56, by the skimming mode, and the second password is detected from the read-out data.

And then, it is judged every time image data is read out from the second document, whether or not the first password and the second password are correlated to each other. If these passwords are correlated to each other, image data of the second document is immediately permitted to be outputted without a password requested to be entered by a user.

As may be understood from above, the first password is used to cancel the second password.

In this embodiment, a correlation between the first password and the second password is whether or not the first password and the second password correspond to each other. However, the correlation is not limited to this embodiment.

Hereinafter, a procedure performed in this image processing apparatus according to this embodiment, to judge whether or not to permit image data to be outputted, will be explained with reference to a flowchart shown in FIG. 8. The procedure is executed by the CPU 15 according to an operation program stored in a recording medium such as a ROM not shown in Figure.

In Step S41, a first document (placed by a user) is read by the image reader 11, and it is judged in Step S42 whether or not image data read out therefrom includes a certain ground pattern. If a certain pattern is detected (YES in Step S42), a first password (Password 1) is detected in Step S43, and then the routine proceeds to Step S44. If a certain pattern is not detected (NO in Step S42), the routine directly proceeds to Step S44.

In Step S44, a second document (a sliding document) is read by the image reader 11, and it is judged in Step S45 whether or not image data read out therefrom includes a certain ground pattern.

If a certain pattern is not detected (NO in Step S45), the image data of the second document is immediately permitted to be outputted in Step S55, since the document is a normal one not protected by security.

If a certain pattern is detected (YES in Step S45), information embedded in the certain pattern is detected (Step S46), and then it is judged whether or not the detected information includes a second password (Password 2) (Step S47).

If there exists no second password (NO in Step S47), the routine skips ahead to Step S55, and the image data of the second document is permitted to be outputted.

If there exists a second password (YES in Step S47), the second password is detected in Step S48, then it is judged in Step S49 whether or not the first password from that first document and the second password correspond to each other.

If these passwords correspond to each other (YES in Step S49), the image data of the second document is permitted to be outputted in Step S52, and then the routine proceeds to Step S53.

If these passwords do not correspond to each other (NO in Step S49), a message requesting entry of a second password is displayed on the display 14*a* of the operation panel 14 in Step S50, and thereby a password is entered. At the same time, image data of the second document can be also displayed thereon.

Subsequently, it is judged in Step S51 whether or not the entered password corresponds to the second password. If it corresponds (YES in Step S51), the image data of the second document is permitted to be outputted in Step S52, and then the routine proceeds to Step S53. If it does not correspond (NO in Step S51), the image data is prohibited from being outputted in Step S54, and then the routine proceeds to Step S53.

In Step S53, it is judged whether or not all the pages of second document are completely read. If all the pages are not yet completely read (NO in Step S53), the routine returns to Step S44, where a following page of second document is read and it is judged in the same manner described above whether or not to permit image data of the following page to be outputted.

If all the pages are completely read (YES in Step S53), the routine terminates.

After completing the routine, the image data permitted to be outputted are printed by a printer or other not shown in Figure.

As described above in this embodiment, about each page of second document, a second password given thereto and a first password for cancelling a second password are compared, and if these passwords correspond (are correlated) to each other about a certain page, image data of that page is permitted to be outputted. In this way, a user such as a right user of the second document can output the second document without entering a password, which contributes to user operability.

Meanwhile, if the first password and the second password do not correspond (are not correlated) to each other about a certain page, entry of a second password is requested, and if an appropriate password is entered, image data of that page is permitted to be outputted, which could prevent documents from being abusively outputted and ensures higher security.

Figure 8:
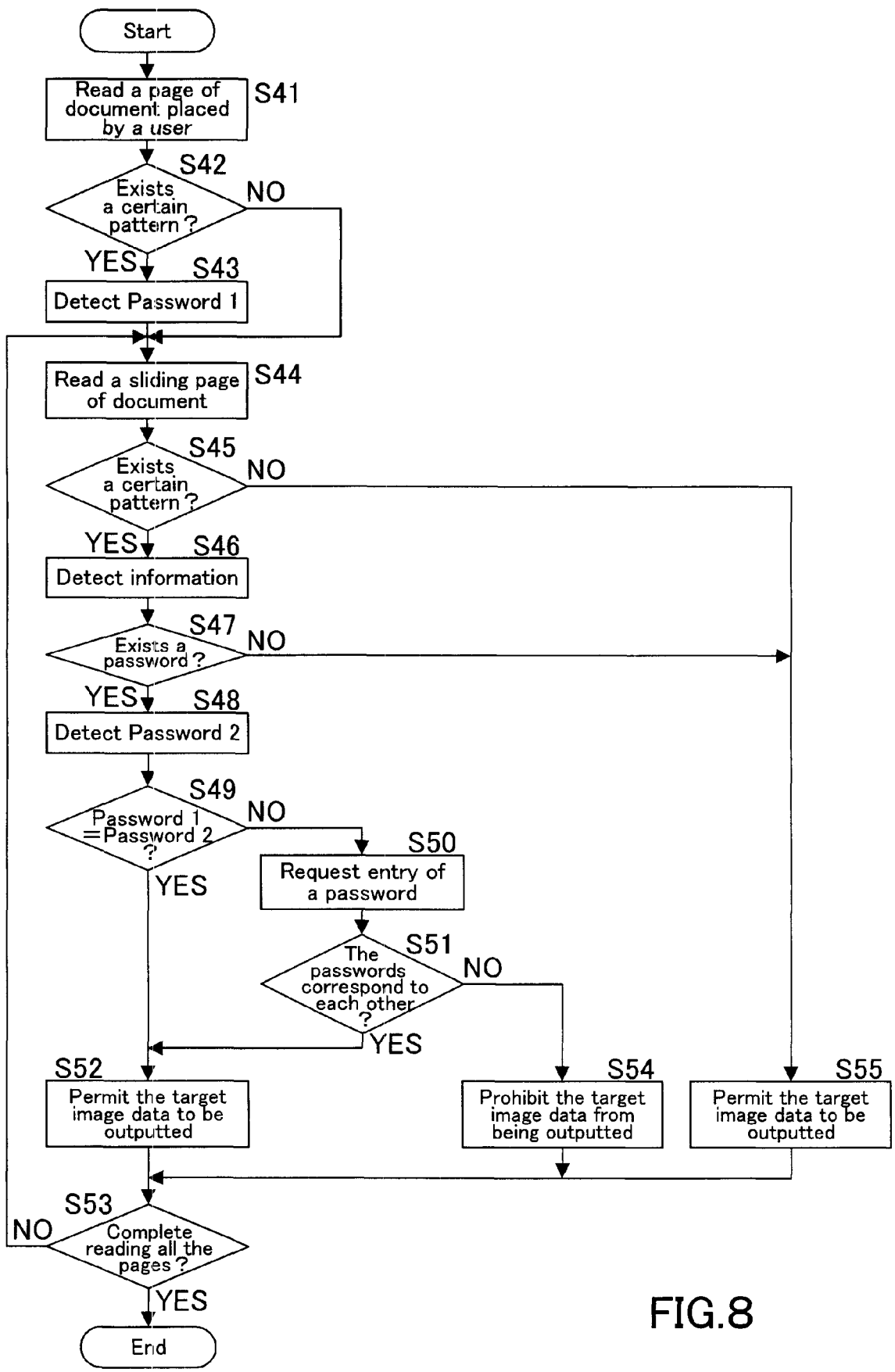
FIG. 8 is a flowchart showing a procedure performed in the image processing apparatus having the image reader shown in FIG. 7, to judge whether or not to permit image data to be outputted.

If a second document consisting of a plurality of pages each having a different second password is read, a first password is detected from each plurality of pages of first document, and it is judged in Step S49 of FIG. 8, whether or not a second password from a certain page that is read, corresponds to any of the detected first passwords. If it corresponds to any, target image data of that page is permitted to be outputted. If it does not correspond to any, entry of a password is requested.

Each explained above is one embodiment of the present invention. However, the present invention is not limited to these embodiments.

For example, in these embodiments, a certain ground pattern having information that is a password embedded therein is given to each page of document. Alternatively, a ground pattern having a password is not given to each of the pages, but an IC tag or other storing a password, or an identification mark indicating a password can be given to each of the pages.

Further, in the embodiment shown in FIG. 8, a first document is used as a medium from which a first password is detected. Alternatively, a first password is not detected therefrom by the image reader 11, but a first password can be detected from a wireless IC tag storing the first password therein, which is given to a card or other, for example.

Summary of the Embodiments

In these embodiments, the following image processing apparatuses, image processing methods and recording mediums are disclosed.

(1) An image processing apparatus comprising:
an input portion that inputs image data of a plurality of pages of document;
a password detector that detects a password given to each of the pages;
a password judger that judges from the detecting results drew by the password detector whether or not different passwords are detected from each of the pages;
a correlation judger that judges about each of the pages if the password judger judges that different passwords are detected from each of the pages, whether or not the passwords are correlated to each other; and
an output permitting portion that permits the image data of all the pages, which are the image data inputted by the input portion, to be outputted without requesting entry of all passwords, if it is judged about each of the pages that the passwords are correlated to each other, on the other hand, requests entry of a password about each of the pages if it is judged about at least one of the pages that the passwords are not correlated to each other, then permits the image data of a certain page to be outputted, if an appropriate password is entered about that page.

With this image processing apparatus, a password(s) is (are) detected from each of the pages, and if it is judged from the detecting result that different passwords are detected from each of the pages, then it is judged about each of the pages whether or not the passwords are correlated to each other. If it is judged about each of the pages that the passwords are correlated to each other, image data of all the pages are permitted to be outputted without any password requested to be entered. Therefore, if a user such as a right user preliminarily sets on each of the pages, a password that is correlated to another password given thereto, he/she can output image data of all the pages each having the passwords when he/she would like to do so, which improves user operability.

On the other hand, if it is judged about at least one of the pages that the passwords are not correlated to each other, entry of a password is requested about each of the pages, which could prevent documents from being abusively outputted and ensures higher security.

(2) Another configuration also can be employed for the image processing apparatus recited in (1) above, wherein if it is judged about each of the pages that the passwords are correlated to each other, the output permitting portion permits the image data of all the pages, which are inputted by the input portion, to be outputted without requesting entry of a password.

With this image processing apparatus, image data of all the pages each having passwords can be outputted without a password requested to be entered, which improves user operability.

(3) Yet another configuration also can be employed for the image processing apparatus recited in (1) above, wherein if it is judged about each of the pages that the passwords are correlated to each other and an appropriate password is entered about at least one of the pages, the output permitting portion permits the image data of all the pages, which are the image data inputted by the input portion, to be outputted.

With this image processing apparatus, even if it is judged about each of the pages that the passwords are correlated to each other, entry of a password is requested, and then if an appropriate password is entered about at least one of the pages, the image data of all the pages are permitted to be outputted, which ensures higher security.

(4) An image processing apparatus comprising:
a first password detector that detects a first password from a medium having the first password given thereto;
a document transfer device;
an image reader that reads an image on a document transferred by the transfer device;
a second password detector that detects a second password from the document;
a judger that judged whether or not the first password detected by the first password detector and the second password detected by the second password detector, are correlated to each other; and
an output permitting portion that permits image data read out from the document by the image reader to be outputted if it is judged that the first password and the second password are correlated to each other, on the other hand, requests entry of a password correlated to the second password, if it is judged that the first password and the second password are not correlated to each other, then permits the image data read out from the document to be outputted if a password correlated to the second password is entered.

With this image processing apparatus, it is judged whether or not a first password detected from a medium having the first password and a second password detected from a document transferred by the document transfer device then read by the image reader, are correlated to each other. If it is judged that the passwords are correlated to each other, image data read out from the document is permitted to be outputted. Therefore, if a user such as a right user simply makes the password detector detect from a medium having a first password, the first password correlated to a second password, then he/she can output a document having the second password without entering a password when he/she would like to do so, which improves user operability.

On the other hand, if it is judged that the first password and the second password are not correlated to each other, entry of a password correlated to the second password is requested, then if an appropriate password is entered, image data read out from the document is permitted to be outputted, which could prevent documents from being abusively outputted and ensures higher security.

(5) Another configuration also can be employed for the image processing apparatus recited in (4) above, wherein if there exist a plurality of mediums and/or the document consists of a plurality of pages, the judger judges about all the combinations whether or not a first password detected from each of the mediums and a second password detected from each of the pages are correlated to each other.

With this image processing apparatus, if there exist a plurality of mediums each having a first password and/or a document consists of a plurality of pages each having a second password, it is judged about all the combinations whether or not a first password and a second password are correlated to each other. Therefore, even if different first passwords are detected from a plurality of mediums and a document consisting of a plurality of pages is read, it is judged about each of the pages whether or not any of the first passwords and a second password are correlated to each other, and then image data is permitted to be outputted or entry of a password is requested, which contributes to user operability.

(6) An image processing method comprising:
inputting image data of a plurality of pages of document;

detecting a password given to each of the pages;

judging from the detecting results whether or not different passwords are detected from each of the pages;

judging about each of the pages if different passwords are detected from each of the pages, whether or not the passwords are correlated to each other; and permitting the inputted image data of all the pages to be outputted without requesting entry of all passwords, if it is judged about each of the pages that the passwords are correlated to each other, on the other hand, requesting entry of a password about each of the pages if it is judged about at least one of the pages that the passwords are not correlated to each other, then permitting the image data of a certain page if an appropriate password is entered about that page.

With this image processing method, if a user such as a right user preliminarily sets on each of the pages, a password that is correlated to another password given thereto, he/she can output image data of all the pages each having the passwords when he/she would like to do so, which improves user operability. On the other hand, if the passwords are not correlated to each other about at least one of the pages, entry of a password is requested about each of the pages, which could prevent documents from being abusively outputted and ensures higher security.

(7) Another configuration also can be employed for the image processing method recited in (6) above, wherein if it is judged about each of the pages that the password are correlated to each other, the inputted image data of all the pages are permitted to be outputted without a password requested to be entered.

With this image processing method, image data of all the pages each having passwords are permitted to be outputted without a password requested to be entered, which improves user operability.

(8) Yet another configuration also can be employed for the image processing method recited in (6) above, wherein if it is judged about each of the pages that the password are correlated to each other, the inputted image data of all the pages are permitted to be outputted under the condition that at least one appropriate password is entered.

With this image processing method, even if it is judged about each of the pages that passwords are correlated to each other, entry of a password is requested, and then if at least one appropriate password is entered, image data of all the pages are permitted to be outputted, which ensures higher security.

(9) An image processing method comprising:

detecting a first password from a medium having the first password given thereto;

reading by an image reader, an image on a document transferred by a document transfer device;

detecting a second password from the document;

judging whether or not the detected first password and second password are correlated to each other; and permitting image data read out from the document by the image reader to be outputted if it is judged that the first password and the second password are correlated to each other, on the other hand, requesting entry of a password correlated to the second password, if it is judged that the first password and the second password are not correlated to each other, then permitting the image data read out from the document to be outputted if a password correlated to the second password is entered.

With this image processing method, if a user such as a right user of a document having a second password simply makes a detector detect a first password correlated to the second password from a medium having the first password, then he/she can output the document having the second password without entering a password when he/she would like to do so, which improves user operability. On the other hand, if it is judged that the first password and the second password are not correlated to each other, entry of a password correlated to the second password is requested, then if an appropriate password is entered, image data read out from the document is permitted to be outputted, which could prevent documents from being abusively outputted and ensures higher security.

(10) Another configuration also can be employed for the image processing method recited in (9) above, wherein if there exist a plurality of mediums and/or the document consists of a plurality of pages, it is judged about all the combinations whether or not a first password detected from each of the mediums and a second password detected from each of the pages are correlated to each other.

With this image processing method, even if different first passwords are detected from a plurality of mediums and a document consisting of a plurality of pages is read, it is judged whether or not any of the first passwords and a second password are correlated to each other, then it is judged whether or not to permit image data to be outputted, which contributes to user conveniences.

(11) A recording medium having an image processing program stored therein to make a computer of an image processing apparatus execute:

inputting image data of a plurality of pages of document;

detecting a password given to each of the pages;

judging from the password detecting result whether or not different passwords are detected from each of the pages;

judging about each of the pages if different passwords are detected from each of the pages, whether or not the passwords are correlated to each other; and permitting the inputted image data of all the pages to be outputted without requesting entry of all passwords, if it is judged about each of the pages that the passwords are correlated to each other, on the other hand, requesting entry of a password about each of the pages if it is judged about at least one of the pages that the passwords are not correlated to each other, then permitting the image data of a certain page to be outputted if an appropriate password is entered about that page.

With this recording medium, a password(s) given to each of the pages is (are) detected, and if it is judged from the detecting results that different passwords are detected from each of the pages, then it is judged about each of the pages whether or not the passwords are correlated to each other. If it is judged about each of the pages that the passwords are correlated to each other, image data of all the pages are permitted to be outputted without any password requested to be entered.

(12) Another configuration also can be employed for the recording medium recited in (11) above, wherein if it is judged about each of the pages that the passwords are correlated to each other, the inputted image data of all the pages are permitted to be outputted without a password requested to be entered, according to the program.

With this recording medium, a computer is made to permit image data of all the pages each having a password to be outputted without a password requested to be entered.

(13) Yet another configuration also can be employed for the recording medium recited in (11) above, wherein if it is judged about each of the pages that the passwords are correlated to each other, the inputted image data of all the pages are permitted to be outputted under the condition that at least one appropriate password is entered, according to the program.

With this recording medium, a computer is made to request entry of a password, even if it is judged about each of the pages that the password are correlated to each other, then permit image data of all the pages to be outputted if at least one appropriate password is entered.

(14) A recording medium having an image processing program stored therein to make a computer of an image processing apparatus execute:
  detecting a first password from a medium having the first password given thereto;
  reading by an image reader an image on a document transferred by a document transfer device;
  detecting a second password from the document;
  judging whether or not the detected first password and second password are correlated to each other; and
  permitting image data read out from the document by the image reader to be outputted if it is judged that the first password and the second password are correlated to each other, on the other hand, requesting entry of a password correlated to the second password if it is judged that the first password and the second password are not correlated to each other, then permitting the image data read out from the document to be outputted if a password correlated to the second password is entered.

With this recording medium, it is judged whether or not a first password detected from a medium having the first password and a second password detected from a document transferred by a document transfer device then read by an image reader, are correlated to each other. And then, a computer is made to permit image data read out from that document to be outputted, if it is judged that the passwords are correlated to each other.

(15) Another configuration also can be employed for the recording medium recited in (14) above, wherein if there exit a plurality of mediums and/or the document consists of a plurality of pages, it is judged about all the combinations whether or not a first password from each of the mediums and a second password from each of the pages are correlated to each other, according to the program.

With this recording medium, a computer is made to judge all the combinations whether or not a first password detected from each of the mediums and a second password detected from each of the pages are correlated to each other.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
  an input portion that inputs image data for a plurality of pages of document;
  a password detector that detects a password given to each of the plurality of pages;
  a password judger that judges from the detecting results drawn by the password detector whether or not different passwords are detected from each of the plurality of pages;
  a correlation judger that judges, in response to the password judger judging that different passwords are detected from each of the plurality of pages, whether or not each of the passwords of the plurality of pages is correlated to each of the other passwords of the remaining plurality of pages;
  wherein the correlation judger judges the passwords to be correlated to each other when the passwords include a common group of numbers, or a common code; and
  an output permitting portion that: (i) permits the image data of all the plurality of pages to be outputted without requesting entry of all passwords, in response to the correlation judger judging for each of the plurality of pages that the passwords are correlated to each other; (ii) requests entry of a password for each of the pages in response to the correlation judger judging for at least one of the plurality of pages that the passwords are not correlated to each other, and then permits the image data of a certain page to be outputted, in response to entry of an appropriate password for that page.

2. The image processing apparatus recited in claim 1, wherein in response to the correlation judger judging for each of the plurality of pages that the passwords are correlated to each other, the output permitting portion permits the image data of all the plurality of pages, which are inputted by the input portion, to be outputted without requesting entry of a password.

3. The image processing apparatus recited in claim 1, wherein in response to the correlation judger judging for each of the plurality of pages that the passwords are correlated to each other and the appropriate password is entered for at least one of the plurality of pages, the output permitting portion permits the image data of all the plurality of pages, which are the image data inputted by the input portion, to be outputted.

4. An image processing apparatus comprising:
  a first password detector that detects a first password from a medium having the first password given thereto;

a document transfer device;

an image reader that reads an image on a document transferred by the transfer device;

a second password detector that detects a second password from the document;

a judger that judges whether or not the first password detected by the first password detector and the second password detected by the second password detector, are correlated to each other;

wherein the judger judges the first and second passwords to be correlated to each other when the first and second passwords include a common group of numbers, or a common code; and an output permitting portion that: (i) permits image data read out from the document by the image reader to be outputted in response to the judger judging that the first password and the second password are correlated to each other; and (ii) requests entry of a password correlated to the second password, in response to the judger judging that the first password and the second password are not correlated to each other, and then permits the image data read out from the document to be outputted in response to entry of a password correlated to the second password.

5. The image processing apparatus recited in claim 4, wherein when there exist a plurality of mediums and/or the document consists of a plurality of pages, the judger judges for all the combinations whether or not a first password detected from each of the mediums and a second password detected from each of the plurality of pages are correlated to each other.

6. An image processing method comprising:

inputting image data for a plurality of pages of document;

detecting a password given to each of the plurality of pages;

judging from the detecting results whether or not different passwords are detected from each of the plurality of pages;

judging, in response to detection of different passwords from each of the plurality of pages, whether or not each of the passwords of the plurality of pages is correlated to each of the other passwords of the remaining plurality of pages;

wherein the passwords are judged to be correlated to each other when the passwords include a common group of numbers, or a common code;

permitting the inputted image data of all the plurality of pages to be outputted without requesting entry of all passwords, in response to a judgment that for each of the plurality of pages that the passwords are correlated to each other; and requesting entry of a password for each of the plurality of pages in response to a judgment that for at least one of the plurality of pages that the passwords are not correlated to each other, and then permitting the image data of a certain page to be outputted in response to entry of an appropriate password for that page.

7. The image processing method recited in claim 6, wherein pages in response to a judgment that for each of the plurality of pages that the password are correlated to each other, the inputted image data of all the plurality of pages are permitted to be outputted without a password requested to be entered.

8. The image processing method recited in claim 6, wherein pages in response to a judgment that for each of the plurality of pages that the password are correlated to each other, the inputted image data of all the plurality of pages are permitted to be outputted under the condition that at least one appropriate password is entered.

9. An image processing method comprising:

detecting a first password from a medium having the first password given thereto;

reading by an image reader, an image on a document transferred by a document transfer device;

detecting a second password from the document;

judging whether or not the detected first password and second password are correlated to each other;

wherein the first and second passwords are judged to be correlated to each other when the first and second passwords include a common group of numbers, or a common code; and permitting image data read out from the document by the image reader to be outputted in response to a judgment that the first password and the second password are correlated to each other; and requesting entry of a password correlated to the second password, in response to a judgment that the first password and the second password are not correlated to each other, and then permitting the image data read out from the document to be outputted in response to entry of a password correlated to the second password.

10. The image processing method recited in claim 9, wherein when there exist a plurality of mediums and/or the document consists of a plurality of pages, it is judged for all the combinations whether or not a first password detected from each of the mediums and a second password detected from each of the plurality of pages are correlated to each other.

11. A non-transitory recording medium having an image processing program stored therein to make a computer of an image processing apparatus execute:

inputting image data for a plurality of pages of document;

detecting a password given to each of the plurality of pages;

judging from the password detecting result whether or not different passwords are detected from each of the plurality of pages;

judging, in response to detection of different passwords from each of the plurality of pages, whether or not each of the passwords of the plurality of pages is correlated to each of the other passwords of the remaining plurality of pages;

wherein the passwords are judged to be correlated to each other when the passwords include a common group of numbers, or a common code; and permitting the inputted image data of all the plurality of pages to be outputted without requesting entry of all passwords, in response to a judgment that for each of the plurality of pages that the passwords are correlated to each other; and requesting entry of a password for each of the plurality of pages in response to a judgment that for at least one of the plurality of pages that the passwords are not correlated to each other, and then permitting the image data of a certain page to be outputted in response to entry of an appropriate password for that page.

12. The non-transitory recording medium recited in claim 11, wherein in response to a judgment that for each of the plurality of pages that the passwords are correlated to each other, the inputted image data of all the plurality of pages are permitted to be outputted without a password requested to be entered, according to the program.

13. The non-transitory recording medium in claim 11, wherein in response to a judgment that for each of the plurality of pages that the passwords are correlated to each other, the inputted image data of all the plurality of pages are permitted to be outputted under the condition that at least one appropriate password is entered, according to the program.

14. A non-transitory recording medium having an image processing program stored therein to make a computer of an image processing apparatus execute:

detecting a first password from a medium having the first password given thereto;

reading by an image reader an image on a document transferred by a document transfer device;

detecting a second password from the document;

judging whether or not the detected first password and second password are correlated to each other;

wherein the first and second passwords are judged to be correlated to each other when the first and second passwords include a common group of numbers, or a common code; and permitting image data read out from the document by the image reader to be outputted, in response to a judgment that the first password and the second password are correlated to each other; and requesting entry of a password correlated to the second password in response to a judgment that the first password and the second password are not correlated to each other, and then permitting the image data read out from the document to be outputted in response to entry of a password correlated to the second password.

15. The non-transitory recording medium recited in claim 14, wherein when there exit a plurality of mediums and/or the document consists of a plurality of pages, it is judged for all the combinations whether or not a first password from each of the mediums and a second password from each of the plurality of pages are correlated to each other, according to the program.

\* \* \* \* \*